United States Patent [19]
Leach, III

[11] Patent Number: 6,106,341
[45] Date of Patent: Aug. 22, 2000

[54] ELECTRONIC POWER DISTRIBUTION MODULE

[75] Inventor: Alfred G. Leach, III, Huntington, N.Y.

[73] Assignee: Northrop Grumman Corporation, Los Angeles, Calif.

[21] Appl. No.: 09/133,473

[22] Filed: Aug. 13, 1998

[51] Int. Cl.[7] .................................................. H01R 11/09
[52] U.S. Cl. ........................................ 439/798; 439/796
[58] Field of Search ................................. 439/796, 797, 439/798, 212, 363, 723, 724; 361/637, 648, 775

[56] References Cited

U.S. PATENT DOCUMENTS

| | | | |
|---|---|---|---|
| 3,668,591 | 6/1972 | Kobryner | 339/724 |
| 3,727,171 | 4/1973 | Coles et al. | 339/110 |
| 4,066,312 | 1/1978 | Faure | 339/42 |
| 4,820,179 | 4/1989 | Saijo | 439/224 |
| 4,861,275 | 8/1989 | Cross | 439/289 |
| 5,266,057 | 11/1993 | Angel, Jr. et al. | 439/724 |
| 5,746,627 | 5/1998 | Bratten | 439/721 |

*Primary Examiner*—Lincoln Donovan
*Assistant Examiner*—Chandrika Prasad
*Attorney, Agent, or Firm*—Terry J. Anderson; Karl J. Hoch, Jr.

[57] ABSTRACT

An electrical bus assembly distributes high current electrical power to a plurality of different devices simultaneously. The electrical bus assembly has a busbar assembly having an electrical conductor and a plurality of studs. At least one multi-contact connector is mounted to the busbar assembly and has a plurality of individual pin contacts in electrical communication with one another, so as to facilitate the transfer of electrical power therethrough. An array of such bus assemblies, defining an electrical power distribution module is also disclosed.

15 Claims, 6 Drawing Sheets

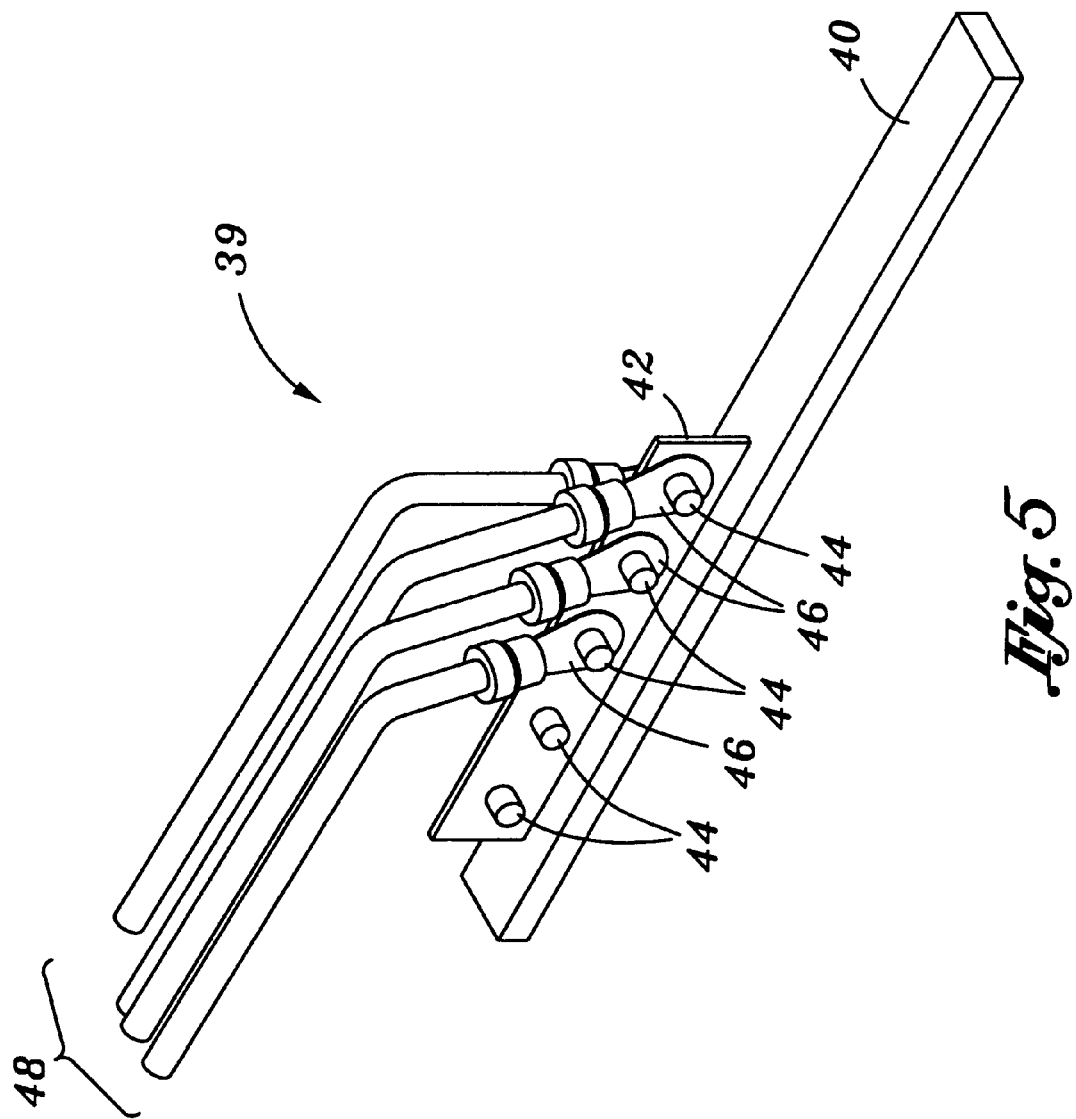

ELECTRONIC POWER DISTRIBUTION MODULE

FIELD OF THE INVENTION

The present invention relates generally to electrical power distribution systems and more particularly to an electrical power distribution module for distributing high current electrical power to a plurality of different electrical devices simultaneously.

BACKGROUND OF THE INVENTION

Electrical power distribution systems for distributing high current electrical power among many different devices simultaneously are known. For example, such contemporary electrical power distribution systems for use on aircraft and the like typically comprise a plurality of busbars, configured as generally flat elongate copper bars, which have a plurality of studs or terminals extending perpendicularly therefrom such that lugs may be placed thereover and held in position with nuts so as to attach wires to the busbars.

However, as those skilled in the art will appreciate, such contemporary power distribution systems are comparatively heavy, larger than desired, and are subject to wiring errors.

Further, according to such contemporary practice, the number of studs and their associated wires varies, of course, with the complexity of the electrical power distribution system of a modern aircraft. For example, it is not unusual for such an electrical power distribution system to comprise several hundred wires. As those skilled in the art will appreciate, this contemporary system of bussing power creates a highly congested area of electrical wiring wherein wiring errors can easily occur. Further, the mechanical properties of wire, i.e., size and bend radius, as well as routing thereof, effect the creation of a complex collection of conductors which is inherently subject to damage during the installation and maintenance thereof. Additionally, the vibration inherently associated with contemporary aircraft frequently results in the chaffing and shorting of such conductors, thereby necessitating time consuming and costly repair.

For example, according to contemporary methodology, a large feeder wire of 0 gauge or an equivalent busbar is typically utilized to bring power to a terminal strip. Based upon a common 60 wire electrical power distribution system, wherein each wire may carry as much as 7.5 amps, a total of 450 amps must be distributed. Even when derated for current density, approximately 300 amps must still be distributed. Typically, a ½ inch feeder or bus is connected to terminal strips having 20 terminals, each terminal having three wires connected to it. Such a contemporary electrical power distribution system occupies an area of approximately 80 square inches.

In view of the foregoing it is desirable to provide an improved electrical power distribution module which facilitates the application of electrical power to the plurality of different electrical devices simultaneously, which facilitates the connection of a large number (128 for example) of connections (contacts) in a connector, to be made simultaneously, and which mitigates subsequent wiring errors further by utilizing positive keying. Preferably, such a system will utilize off-the-shelf connectors which are readily available and comparatively inexpensive. It is further desirable to reduce the weight and volume of such an electrical power distribution system. The major components of the electrical power distribution system should be easily replaced if damaged, without requiring the removal of other modules. The use of conventional terminal strips should be eliminated, so as to facilitate such reduction in volume. Further, it would be desirable to enable the use of 160 wires, providing six different signals or power levels, which can be connected in a matter of minutes without the likelihood of wiring errors. It is further desirable that such an electrical power distribution system readily accommodates future expansion. Further, it is necessary that this system operate reliably in a high vibration environment through a wide temperature range.

SUMMARY OF THE INVENTION

The present invention specifically addresses and alleviates the above mentioned deficiencies associated with the prior art. More particularly, the present invention comprises an electrical bus assembly for distributing high current electrical power to a plurality of different devices simultaneously. The electrical bus assembly comprises a busbar assembly comprising an electrical conductor and a plurality of studs and at least one mounted multi-contact connector mounted to the busbar assembly. The mounted multi-contact connector has a plurality of individual contacts in electrical communication with one another, so as to facilitate the transfer of electrical power therethrough.

Each multi-contact connector preferably further comprises a conductive disk to which a plurality of the individual contacts are attached, so as to facilitate electrical conduction therebetween. The individual pin or socket contacts are formed to the disk, preferably via welding, brazing, soldering, via mechanical fasteners, etc. As those skilled in the art will appreciate, any method for forming the individual contacts to the conductive disk is suitable as long as the method facilitates electrical communication between the individual contacts and the conductive disk. Indeed, the individual contacts and the conductive disk may be formed as a single, integral unit, if desired.

The conductive disk is preferably configured so as to conduct a maximum current of all of the individual contacts combined such that the mounted multi-contact connector is capable of delivering a full current load to each of the devices connected thereto.

According to the preferred embodiment of the present invention the mounted multi-contact connector comprises a circular connector, such as those wherein the complementary mating connector-plug is attached thereto by pushing the two connectors together such that the pins of the male contact are inserted within the sockets of the female contact, then twisting a collar so as to secure the two connectors together. However, those skilled in the art will appreciate that various other types of connectors, i.e., square, rectangular, D, etc., may be utilized. The individual contacts of the mounted multi-contact connector may comprise either male pin contacts or female socket contacts, as desired.

The preferred embodiment of the present invention further comprises a complementary multi-contact connector-plug which is configured to mate to the mounted multi-contact connector, the complementary multi-contact connector-plug similarly comprising a plurality of individual contacts, so as to facilitate proper connection to corresponding individual contacts of the mounted multi-contact connector. The plurality of individual contacts of the complementary multi-contact connector-plug will not be in electrical communication with one another, so each contact can supply power to an individual piece of equipment.

The electrical conductors, i.e., wires, attached to the contacts of the complementary multi-contact connector-plug of the present invention may distribute electrical power in any desired manner. As the contacts are attached to a conductive disk, the ability to attach wires is precluded. Similarly the contacts in the complementary connector plug would give up the ability to attach wires if they were part of a common conductive disk. The disk is meant to "sit" on a bus assembly or bus bar.

According to the preferred embodiment of the present invention, the busbar comprises a conductive bar having a generally planar elongate conductor extending generally perpendicularly therefrom so as to provide a T configuration. Studs extend from the planar elongate conductor so as to provide for attachment of lugs thereto.

As those skilled in the art will appreciate, generally circular lugs are commonly utilized to attach electrical conductors, i.e., wire or cables, to busbars. This is typically accomplished by placing the generally circular lug over the stud such that the stud is received into the opening of the generally circular lug, and then placing a nut onto the stud and tightening it so as to hold the lug firmly in place. The busbar of the present invention is preferably configured such that the studs extending from the planar elongate conductor accommodate at least three lugs each, so as to facilitate the distribution of electrical power to a greater number of electrical devices. The conductive bar and the generally planer elongate conductor extending therefrom are preferably formed of copper and may be attached to one another via welding, brazing, soldering, or may, alternatively, be formed as a single, integral unit. Those skilled in the art will appreciate that any method of attaching the conductive bar to the generally planar elongate conductor may be utilized as long as the method facilitates adequate electrical conduction therebetween.

The conductive bar and the planar elongate member are preferably sized so as to accommodate the maximum amount of current which is conducted to all of the connectors of the busbar. Thus, the busbar is capable of providing the maximum amount of electrical power required by all of the devices powered therefrom.

According to the preferred embodiment of the present invention, the studs are configured so as to extend generally parallel to the conductive bar. In this manner, the electrical conductors, i.e., wires or cables, extending from the lugs attached to the studs may extend outwardly, away from the busbar without substantial bending thereof. This both reduces stress in the electrical conductors (thereby mitigating electrical failures do to breakage thereof) and also facilitates more convenient and shorter routing of the electrical conductors.

Those skilled in the art will appreciate that contemporary busbars, having the studs extend outwardly therefrom and perpendicularly thereto, require that the electrical conductors attached thereto be bent substantially so as to facilitate routing of the electrical conductors to the stud. This not only makes the routing of such electrical conductors undesirabley complex, but also tends to place the electrical conductors, particularly at the attachment point to the lugs thereof, under undesirable stress which may result in breakage of the electrical conductors and/or undesirable disconnection of the electrical conductors from the lugs thereof.

According to the preferred embodiment of present invention, the studs extend from both sides of the generally planar elongate member, so as to further enhance the density of attachment points of the electrical bus assembly.

Further, according to the preferred embodiment of the present invention, a trough formed of an insulting material is provided such that the busbar is at least partially disposed therein. In this manner, the trough provides electrical protection for the busbar so as to mitigate undesirable contact therewith. Those skilled in the art will appreciate that the use of such a trough helps to prevent maintenance and repair personnel from inadvertently touching an electrically active busbar with tools or other conductors in a manner which may cause damage thereto or which may damage other electrical equipment or even harm personnel.

According to the present invention, an electrical power distribution module for distributing high current electrical power to a plurality of different devices simultaneously is provided by assembling a plurality of such electrical bus assemblies, preferably having associated insulating troughs, into an array thereof. In this manner, electrical power is distributed via a device which mitigates the volume required to do so, and the weight thereof. Such reduction in the weight volume and weight requirements of the electrical distribution module makes it particularly suitable for use in aircraft and the like, wherein weight and volume consideration are crucial.

The present invention is further configured so as to facilitate from 3 to 128 connections simultaneously, so as to provide electrical power to a greater number of devices. Crossed wiring or other wiring errors are mitigated via the use of multi-contact connectors, having positive keying. That is, the multi-contact connectors are keyed according to well known methods such that each complimentary multi-contact connector can only be attached to the proper mounted multi-contact connector.

The present invention preferably utilizes off the shelf connector shells, which are commonly in stock and comparatively inexpensive. All of the parts of the present invention are easily replaceable, when necessary. Further, according to the present invention 160 wires, providing 6 different signals, may be connected in minutes substantially without wiring errors. The electrical power distribution module of the present invention also readily accommodates future growth, since additional electrical bus assemblies may be added thereto, simply by mounting them in the same array, or, alternatively, by forming another array adjacent thereto.

BRIEF DESCRIPTION OF THE DRAWINGS

FIG. 4b is a perspective view of the assembled mountable multi-contact connector of FIG. 4a;

FIG. 5 is a perspective view of a busbar according to the present invention;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also to be encompassed within the spirit and scope of the invention.

Figure 1:
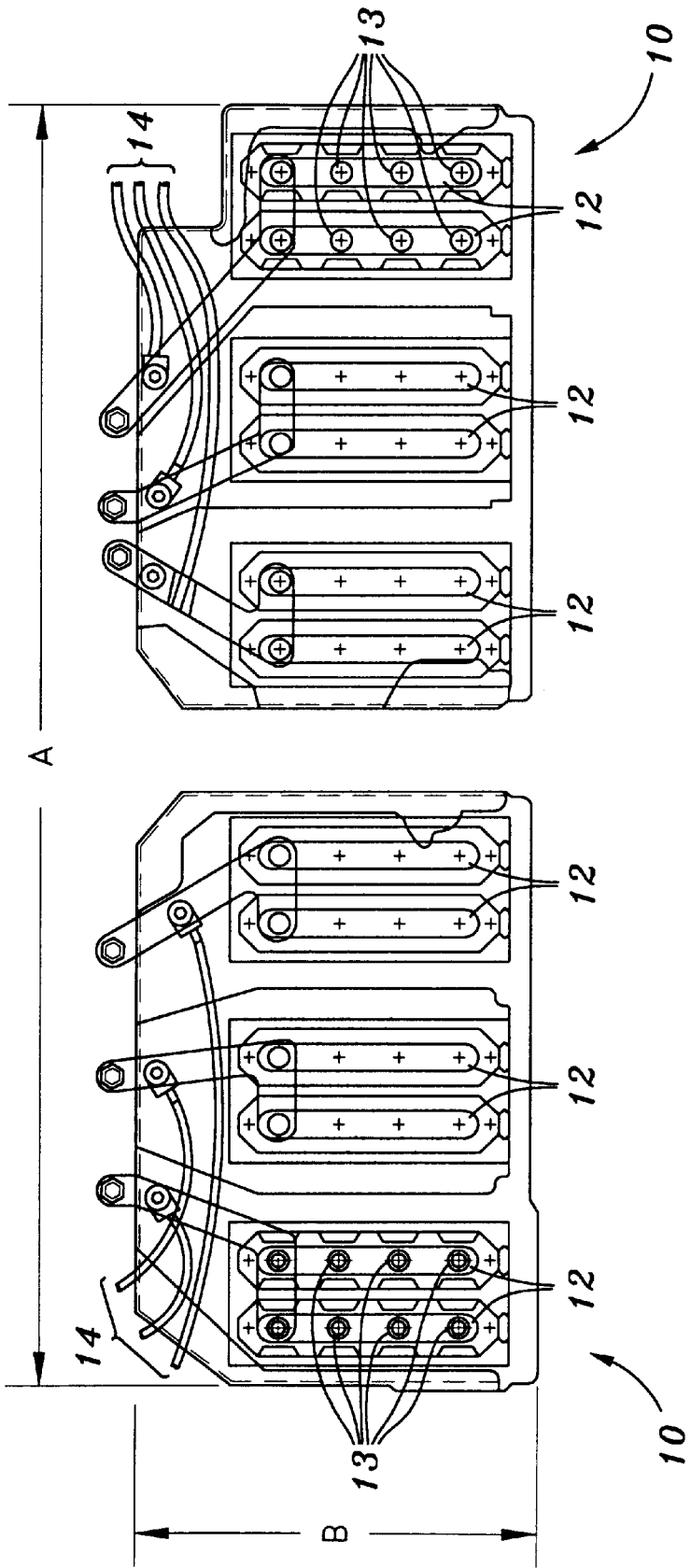
FIG. 1 shows two contemporary electrical power distribution modules utilizing prior art terminal strips, each capable of distributing 3 different signals.
Figure 2:
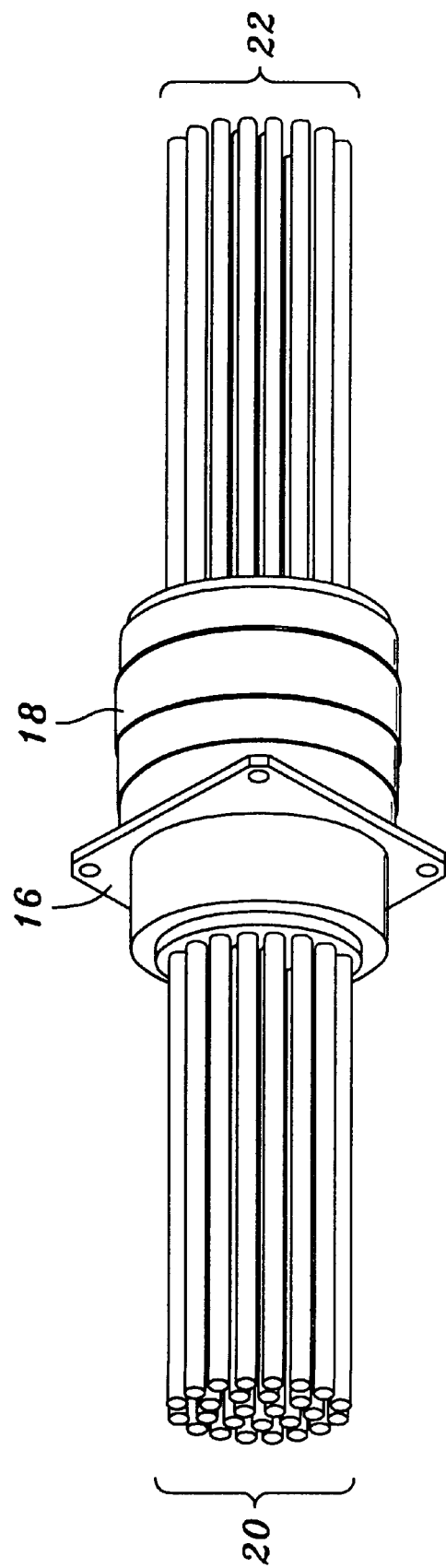
FIG. 2 shows a prior art circular electrical connector comprising a mountable multi-contact connector-receptacle and a complementary multi-contact connector-plug, each having a plurality of electrical conductors extending therefrom.

The electrical bus assembly of the present invention is illustrated in FIGS. 3–7, which depict a presently preferred embodiment thereof. FIGS. 1 and 2 show a prior art electrical distribution system utilizing terminal strips and a circular electrical connector, respectively.

Referring now to FIG. 1, a conventional electrical power distribution module 10 typically comprises a plurality of terminal strips 12 to which electrical power is supplied via electrical conductors 14, i.e., wire or cables. Electrical conductors for facilitating the distribution of electrical power from each terminal strip 12 to the desired electrical device are typically attached to the terminal strips via lugs which are placed over studs 13 formed to the terminal strips. The lugs are then typically held in place with nuts which threadably engage to the stud 13.

As those skilled in the art will appreciate, such contemporary electrical distribution modules have substantial weight and occupy a substantial volume. For example, the two typical contemporary power distribution modules 10 of FIG. 1, which provide six pairs of terminal strips 12, which are typical of those commonly used in aircraft applications, have a total length, dimension A, of approximately 26 inches and a total width, dimension B, of approximately 10 inches.

Because of the volume and weight constraints associated with such aircraft applications, it is desirable to provide an electrical distribution system which substantially reduces the size and weight of the electrical distribution modules thereof. However, as those skilled in the art will appreciate, such contemporary power distribution modules as those shown in FIG. 1, which are used to supply high current electrical power to a variety of different electrical devices simultaneously are undesirabley subject to wiring errors. For example, each pair of terminal strips 12 may, for example, be utilized to supply a different voltage, or a different phase in AC systems. Thus, it is easy to appreciate that wiring errors, wherein a particular wire is inadvertently attached to the wrong terminal strip 12, can easily occur.

Thus, conventional power distribution within an aircraft or the like is typically accomplished by providing electrical power to a plurality of such terminal strips 12, wherein each terminal strip comprises multiple terminals or lugs 13. Lugs are attached to the terminal strips via the studs 13 and power is thus delivered to various electrical devices at different locations within the aircraft. The number of terminal strips and studs, as well as the associated wires connected thereto varies with the complexity of the electrical power distribution system of the aircraft. It is not unusual to have several hundred wires attached according to this method in a modern aircraft.

As those skilled in the art will appreciate, this contemporary system of electrical bussing creates highly congested and complex wiring at the electrical distribution modules wherein miswiring frequently occurs. Further, the necessary bending and routing of the wires attached to the terminal strips of such a conventional electrical power distribution system introduces undesirable stresses into the wires, thereby making them prone to breakage. Long periods of continuous vibration inherent to operation of the aircraft frequently results in chaffing and shorting of such wires, thereby necessitating costly and time consuming repair thereof.

This conventional method for distributing electrical power typically requires a large feeder wire, of 0 gauge or an equivalent busbar, for example. In a system having 60 separate wires, each carrying a maximum of 7.5 amps, 450 total amps are possible. Even when this number is derated for current density, approximately 300 amps are utilized. The ½ inch feeder or bus of such contemporary systems is connected to a plurality of separate terminal strips, each typically having 20 separate terminals or studs. Typically, three wires can be connected to one stud. The ½ inch feeder, connected to a plurality of such terminal strips typically occupies an area of approximately 80 square inches. This corresponds to one of the six electrical distribution modules 10 shown in FIG. 1.

Referring now to FIG. 2, standard connectors such as circular mountable connector receptacle 16 and its complementary circular connector-plug 18 are commonly used in power and signal routing applications. However, when used in such power applications a disadvantage of these connectors is that each used electrical contact thereof requires that a wire be provided back from the electrical connector to the power source, i.e., the electrical distribution system. Thus, anywhere from three to as many as 128 wires per connector must be fabricated, routed, terminated, clamped, and protected from chaffing. As those skilled in the art will appreciate, this is a substantially complex, time consuming and expensive task.

Further, as those skilled in the art will appreciate, when chaffing of the wires does occur, the heavy bundle of wires must typically be removed from the aircraft and disassembled in order to effect proper repair thereof.

The present invention, depicted in FIGS. 3–7 and discussed below mitigates the need for such complex wiring associated with electronic power distribution and consequently mitigates the need to remove portions of the electrical distribution system in order to effect proper repair thereof.

The electrical bus assembly of the present invention generally comprises a busbar assembly and at least one mounted multi-contact connector mounted to the busbar assembly. The busbar assembly is configured so as to facilitate the attachment of the plurality of conductors, i.e., wires or cables, thereto via lugs which attach to complementary studs formed upon the busbar assembly. The busbar also mitigates wire fatigue via the use of studs which are parallel to the bottom member thereof. The mounted multi-contact connectors facilitate the attachment of a large number, typically three to 128, individual wires to the busbar assembly via the use of a single connector, so as to facilitate electrical power distribution to a large number of individual electrical devices in a manner which is easy to use and which mitigate cross wiring errors and wire fatigue.

Figure 3:
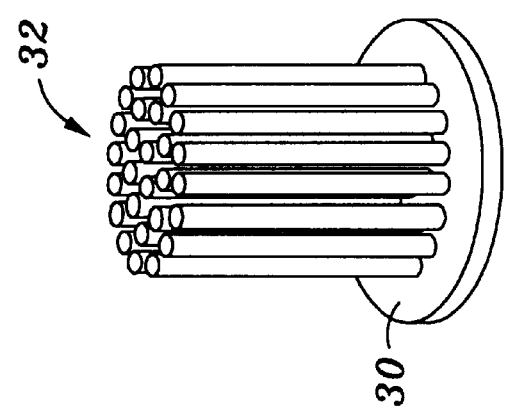
FIG. 3 is a perspective view of a conductive disk to which a plurality of individual contacts are attached.

Referring now to FIG. 3, the preferred embodiment of the present invention comprises a plurality of individual contacts 32 which are in electrical communication with a conductive disk 30. The individual electrical contacts 32 may be formed to the conductive disk 30 via welding, brazing, soldering, the use of mechanical fasteners, or alternatively the individual electrical contacts 32 and the conductive disk 30 may be formed as a single, integral unit via machine, molding, or the like. The individual contacts 32 comprise either male or female contacts which are configured to facilitate electrical connection to a complimentary plurality of individual pin contacts. Thus, each individual contact 32 may comprise either a solid contact when configured as a male contact and, must comprise a hollow contact having a central bore therethrough when configured as a female contact, so as to facilitate insertion of the complementary male pins of a mating connector.

Figure 6:
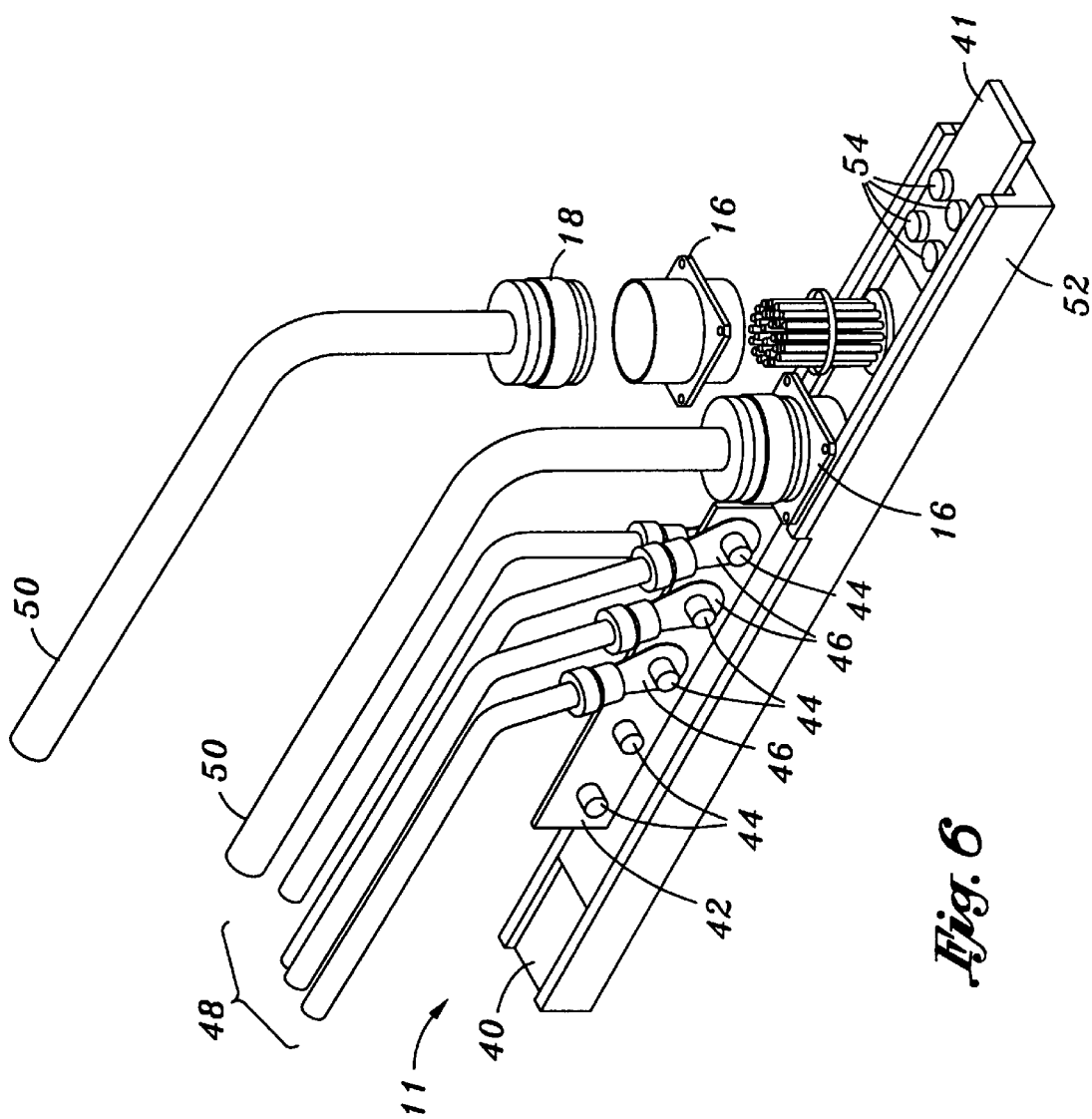
FIG. 6 is a perspective view of an electrical bus assembly comprising two mounted multi-contact connectors, such as those of FIGS. 4a and 4b, and also comprising the busbar assembly of FIG. 5.
Figure 7:
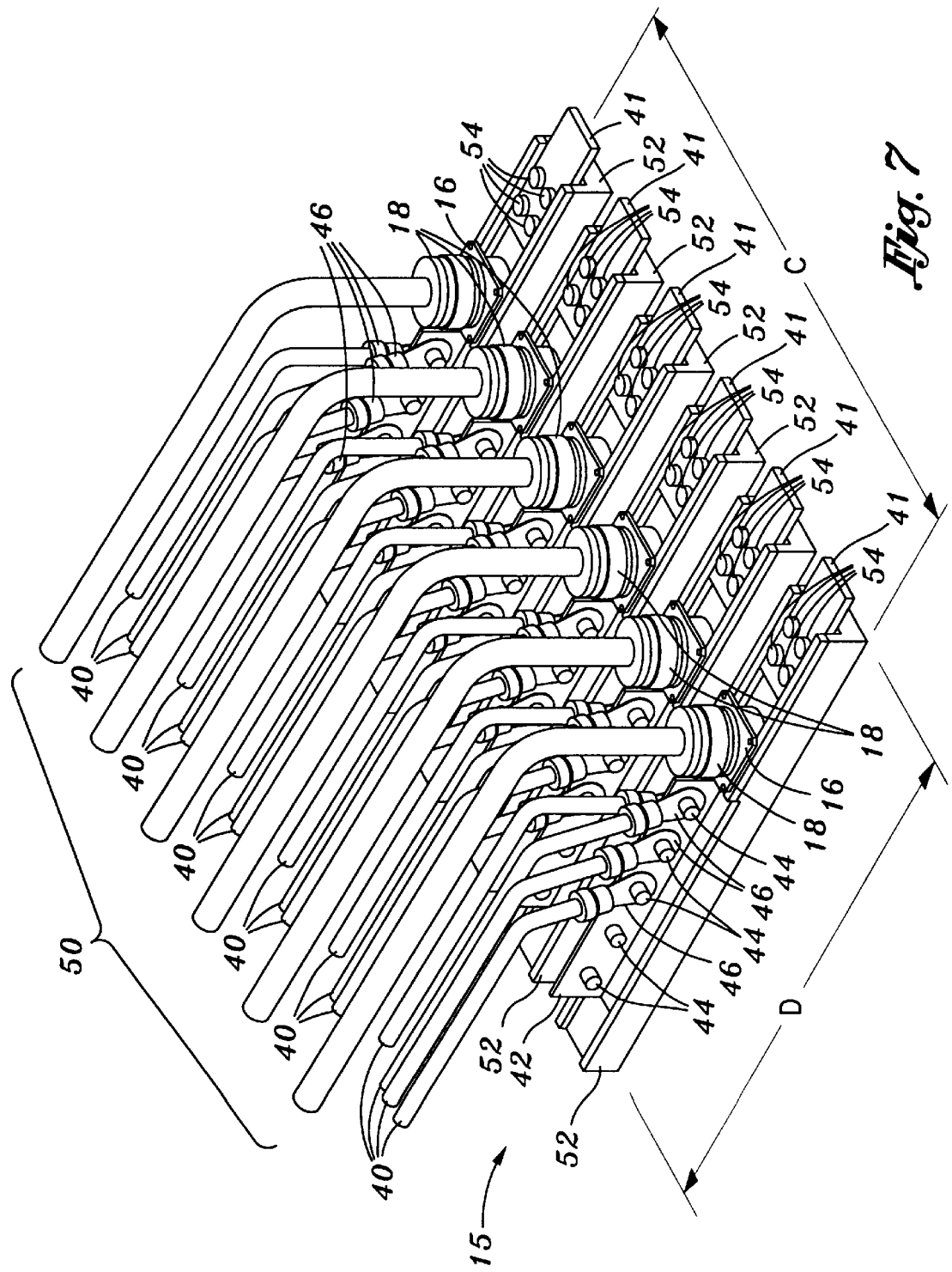
FIG. 7 is a perspective view of an electrical power distribution system comprising six electrical bus assemblies, such as those of FIG. 6.

The conducting disk 30 is in electrical communication with the conductive bar 40 of FIGS. 5–7 and held in place with hardware (i.e., screws through the mounted connector). This is so the conductive disk with its contacts may be replaced if damaged.

Thus, according to the present invention, the conductive disk 30 and the plurality of individual conductive contacts 32 provide a common source of electrical power to a plurality of corresponding individual contacts of a mating plug so as to facilitate the distribution of electrical power to one or more electrical devices and also so as to facilitate connection and disconnection of the electrical devices from the power distribution module of the present invention via simply attaching or disconnecting a single connector.

The conductive disk 30 is preferably configured such that it is capable of accommodating the maximum current flow of all of the individual contacts 32 simultaneously. Thus, all of the electrical devices attached to the individual contacts 32 and receiving electrical power therefrom may be operated at their maximum current capacity simultaneously without overloading the present invention. The individual contacts 32 are preferably standard socket contacts compatible with mating to their corresponding individual pin contacts of the mating plug.

The conductive disk 30 and the integral contacts 32 thus take the place of the original individual contacts of the mountable connector.

Thus, according to the preferred embodiment of the present invention, a standard connector 16 is utilized, a standard mating plug can be attached thereto and installed in a single, easy procedure. For example, a standard connector with 60 individual 20 gauge contacts, each of which is rated at 7.5 amps, may be attached in a single action utilizing area of approximately only 2.5×2.5 inches, as opposed to the conventional method of individually attaching 60 separate lugs with a terminal strip occupying a much larger area.

Referring now to FIG. 5, the present invention comprises a conductive bar 40 from which the generally planar elongate conductor 42 extends generally perpendicularly with respect thereto. A plurality of studs 44 extend from both sides of the planar elongate conductor 42, so as to facilitate the attachment of a plurality of lugs 46 thereto. The lugs 46 facilitate the attachment of electrical conductors 48 to the busbar 39. Those preferably configured so that each stud 44 can accommodate up to three lugs 46. By forming studs 44 on both sides of the planar elongate conductor 42, twice as many electrical conductors 48 can be attached to the busbar 39 as can be attached according to the prior art.

According to the preferred embodiment of the present invention, the busbar 39 comprises a copper conductive bar 40 and a copper planar elongate conductor 42 attached to one another via welding, brazing, soldering, the use of mechanical fasteners, or, the conductive bar 40 and the planar elongate conductor 42 may be formed as a single, integral unit via molding, machining, extrusion, etc.

The studs 44 are typically used to facilitate the attachment of larger wires, i.e., those carrying a greater amount of current, from the busbar 39 of the present invention. The mounted multi-contact connectors 16 are typically utilized when less current capacity is needed. However, as those skilled in the art will appreciate, plurality of the wires extending from a given connector 16 may optionally be electrically connected to one another and utilized to provide electrical current to an electrical device, as a group. In this manner, the electrical current carrying capacity associated with the mounted multi-contact connectors 16 may be enhanced. Indeed, all of the individual electrical conductors within a particular cable 50 may be utilized to supply current to a single electrical device, if desired.

The busbar, comprising the conductive bar 40 and the planar elongate conductor 42, is preferably configured so as to accommodate the maximum current flow which occurs when all of the devices (including those attached via studs 44, as well as those attached via mounted multi-contact connectors 16) attached thereto simultaneously draw their maximum currents.

Figure 4B:
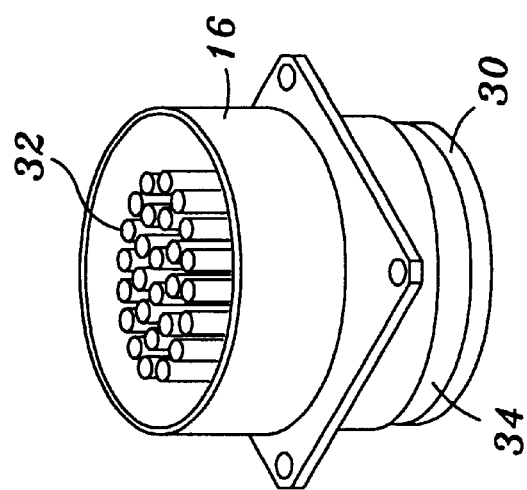
Figure 4A:
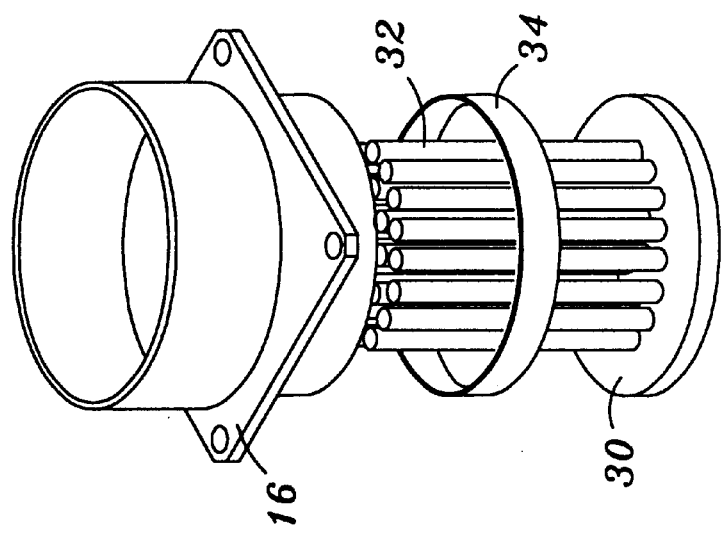
FIG. 4a is an exploded perspective view of a mountable multi-contact connector comprising the individual contacts and conductive disk of FIG. 3.

Referring now to FIGS. 4a and 4b, the individual pin contacts 32 and the attached conductive disk 30 are disposed within standard shell or receptacle of connector 16. Annular insulator 34 prevents undesirable electrical contact between the conductive disk 30 and the connector 16.

Referring now to FIG. 6, an insulating trough 52 is preferably utilized to provide a degree of electrical isolation to the busbar 39, so as to prevent inadvertent and possibly dangerous contact therewith and is the support for the busbar 39.

As shown in FIG. 6, the electrical conductors, i.e., the wires and/or cables, 48, 50 extending from the electrical bus assembly 11 generally extend away therefrom smooth, gentle curve, not requiring that the wires make abrupt ends which may contribute to fatigue and eventual chaffing, or failure thereof.

It is important to note that the electrical bus assembly 11 of the present invention reduces the volume of an electrical distribution module defined thereby by approximately ½. Thus, the modular approach of the present invention provides an electrical distribution system having less volume, less weight, requiring less maintenance, and being in less danger of shorting due to chaffing of the electrical conductors attached thereto. Further, both the busbar assembly 11 of the present invention, as well as the mated multi-contact connectors thereof may be disassembled and reassembled without requiring the removal of other components, in an aircraft for example.

Referring now to FIG. 7, an array of busbar assemblies 11, such as those in FIG. 6, is shown. This busbar assembly facilitates the attachment of 2 through 22 gauge wire, and provides a plug in feature so as to save not only space and weight in aircraft applications, but also so as to facilitate rapid and easy maintenance.

As shown, the electrical power distribution module 15 of the present invention accommodates 6 different power signals, which may be distributed to 330 different components.

As shown, the electrical distribution module 15 has a length, dimension C, of 13 inches and a width, dimension D, of 9.5 inches. It corresponds generally to the functionality afforded by the prior art electrical distribution modules of FIG. 1, which have a total length, dimension A, of 26 inches and a width, dimension B, of 10 inches. Thus, as those skilled in the art will appreciate, the electrical distribution module 15 of the present invention occupies substantially less volume than a corresponding prior art device.

It is understood that the exemplary electrical bus assembly and array described herein and shown in the drawings represent only presently preferred embodiments of the invention. Indeed, various modifications and additions may be made to such embodiments without departing from the spirit and scope of the invention. For example, various materials other than copper may be utilized in the construction of the busbar assembly and the mounted multi-contact connector of the present invention. Further, the busbar assembly need not be generally T-shaped in configuration, but may be of any other desirable configuration. For example, the busbar assembly may be generally square, rectangular, hexagonal, octagonal-"L" shaped, triangular, etc., in cross sectional configuration, as desired. Further, those skilled in the art will appreciate that various different multi-contact connectors, other than the circular ones shown and described above, may be utilized. For example, square connectors, rectangular connectors, D connectors, etc., may be utilized, as desired. Thus, these and other modifications and additions may be obvious to those skilled in the art may be implemented to adapt the present invention for use in a variety of different applications.

What is claimed is:

1. An electrical bus assembly for distributing high current electrical power to a plurality of different devices simultaneously, the electrical bus assembly bus assembly comprising:
    a) a conductive bar;
    b) an elongated conductor extending generally perpendicular to said conductive bar;
    c) a plurality of studs extending perpendicular to both sides of said elongated bar; and
    d) at least one multi-contact connector assembly mounted to said conductor bar, the connector assembly comprising;
        i) a conductive disk slidably engagable to said conductive bar;
        ii) a plurality of individual rod-shaped contacts, each of said individual contacts being in electrical contact with and extending perpendicular from the conductive disk; and
        iii) a multi-contact connector formed about the contacts, said multi-contact connector being detachably engagable to said conductive bar to facilitate reduction or augmentation of the number of contacts as required to accommodate electrical power requirements of the multi-contact connector.

2. The electrical bus assembly as recited in claim 1, wherein each multi-contact connector further comprises a conductive disk to which all of the individual contacts are formed, the conductive disk being configured so as to conduct a maximum current of all of the individual contacts combined.

3. The electrical bus assembly as recited in claim 1, wherein the multi-contact connector comprises a circular connector.

4. The electrical bus assembly as recited in claim 1, wherein the individual contacts comprises female contacts.

5. The electrical bus assembly as recited in claim 1, further comprising a complimentary multi-contact connector configured to mate to the multi-contact connector, the complimentary multi-contact connector comprising a plurality of individual contacts.

6. The electrical bus assembly as recited in claim 1, further comprising a complimentary multi-contact connector plug configured to mate to the multi-contact connector, the complimentary multi-contact connector plug comprising a plurality of individual contacts which are in electrical communication with one another, such that all of the contacts of the complimentary multi-contact connector cooperate with one another to provide conduction of a single power signal.

7. The electrical bus assembly as recited in claim 1, wherein the busbar assembly comprises a conductive bar having a generally planar elongate conductor extending generally perpendicularly therefrom and the studs extend from the planar elongate conductor.

8. The electrical bus assembly as recited in claim 1, wherein the busbar assembly comprises a conductive bar having a generally planar elongate conductor formed thereto extending generally perpendicularly therefrom so as to generally define a "T" or an "L" and the studs extend from the planar elongate conductor.

9. The electrical bus assembly as recited in claim 1, wherein the busbar assembly comprises a conductive bar having a generally planar elongate conductor extending generally perpendicularly therefrom, the conductive bar and the planar elongate member being sized to accommodate a maximum amount of current which is conducted through all connections to the busbar.

10. The electrical bus assembly as recited in claim 1, wherein the busbar assembly is comprised of copper.

11. The electrical bus assembly as recited in claim 1, wherein the studs are each configured to attach three lugs thereto.

12. The electrical bus assembly as recited in claim 1, wherein the studs are configured to extend generally parallel to the conductive bar.

13. The electrical bus assembly as recited in claim 1, wherein the studs extend from two opposed sides of the generally planar elongate member.

14. The electrical bus assembly as recited in claim 1, further comprising trough formed of an insulating material within which the busbar is at least partially disposed so as to mitigate undesirable contact therewith.

15. An electrical power distribution module for distributing high current electrical power to a plurality of different devices simultaneously, the module comprising:
    a) a conductive bar;
    b) an elongated conductor extending generally perpendicular to said conductive bar;
    c) a plurality of studs extending perpendicular to both sides of said elongated bar; and
    d) at least one multi-contact connector assembly mounted to said conductor bar, the connector assembly comprising;
        i) a conductive disk slidably engagable to said conductive bar;
        ii) a plurality of individual rod-shaped contacts, each of said individual contacts being in electrical contact with and extending perpendicular from the conductive disk; and
        iii) a multi-contact connector formed about the contacts, said multi-contact connector being detachably engagable to said conductive bar to facilitate reduction or augmentation of the number of contacts as required to accommodate electrical power requirements of the multi-contact connector.

* * * * *

UNITED STATES PATENT AND TRADEMARK OFFICE
CERTIFICATE OF CORRECTION

PATENT NO.     : 6,106,341                                                         Page 1 of 1
DATED          : August 22, 2000
INVENTOR(S)    : Alfred G. Leach, III It is certified that error appears in the above-identified patent and that said Letters Patent is hereby corrected as shown below:

<u>Column 1,</u>
Line 3, before the "FIELD OF THE INVENTION", please insert the following:

-- STATEMENT RE: FEDERALLY SPONSORED RESEARCH/DEVELOPMENT
This invention was made with Government support under N00019-97-C-0147 awarded by the Department of the Navy. The Government has certain rights in this invention. --

Signed and Sealed this

Twenty-fourth Day of June, 2003

JAMES E. ROGAN
*Director of the United States Patent and Trademark Office*